Patented May 12, 1936

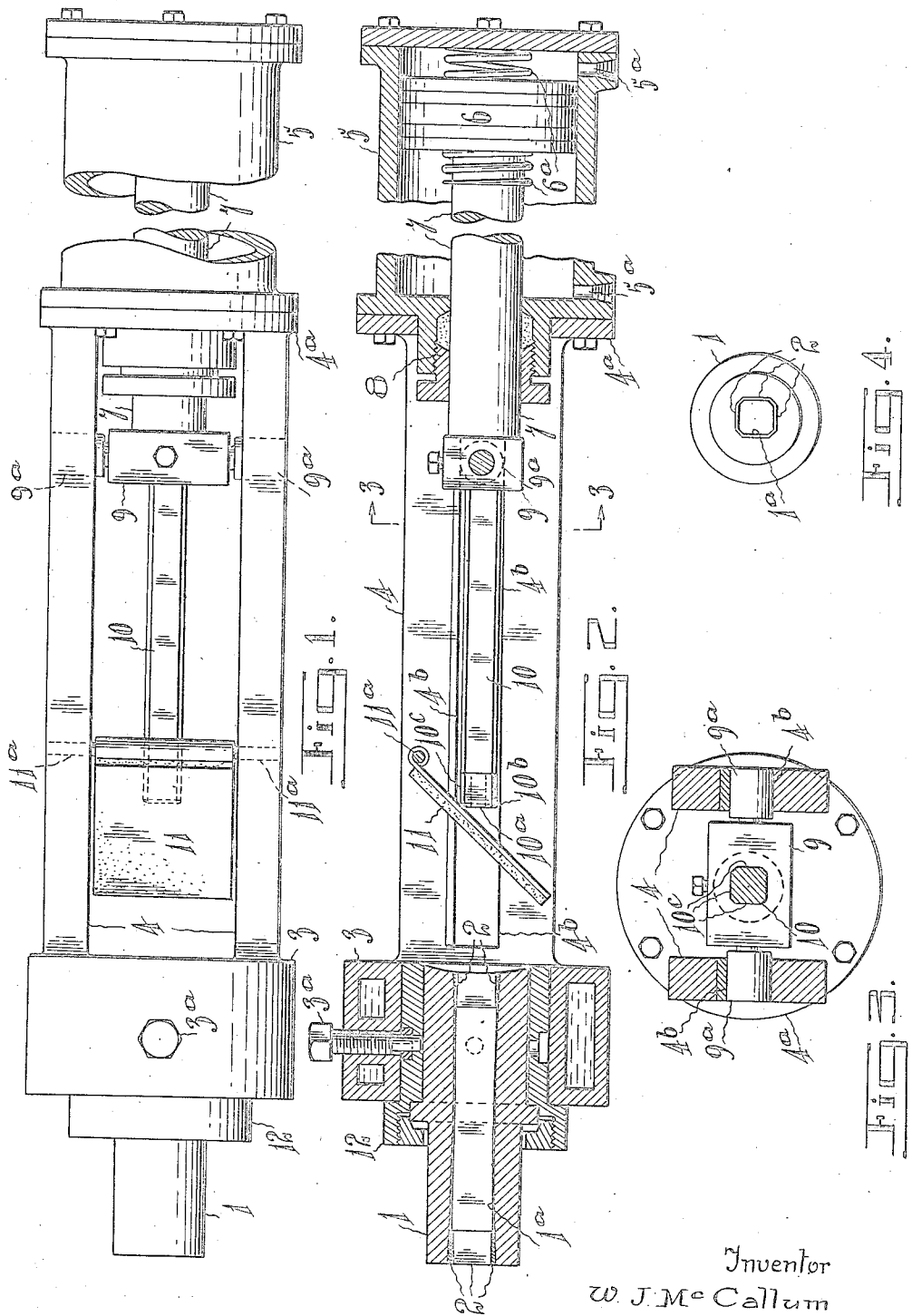

2,040,621

UNITED STATES PATENT OFFICE 2,040,621

METHOD OF AND APPARATUS FOR APPLYING INSERTS

William J. McCallum, Islington, Ontario, Canada

Application January 4, 1934, Serial No. 705,257
In Canada January 2, 1934

6 Claims. (Cl. 78—82)

This invention relates to a method of and apparatus for applying an insert in the bore of a piece of work, such as a chuck for use on a rock drill either for facing the bore at the points of greatest wear with material of greater hardness and durability than the material of which the chuck is made or for refacing the bore of the chuck with such material when the bore becomes worn, thus conditioning the chuck for further use. The object of the present invention is to devise a simple method and apparatus for effectively accomplishing the application and the finishing of such hard internal faces.

I attain my object by heating the chuck, applying molten insert material on the heated surface and shaping the insert material while it is plastic. Allowance is made for the contraction of the refaced bore upon cooling.

The method and apparatus are hereinafter more fully described and are illustrated in the accompanying drawing in which Fig. 1 is a plan view of the apparatus;
Fig. 2 a longitudinal section thereof;
Fig. 3 a cross section on the line 3—3 in Fig. 2; and
Fig. 4 an end view of a chuck.

In the drawing like numerals of reference indicate corresponding parts in the different figures.

1 is a chuck or other piece of work having a polygonal bore 1a adapted to receive a correspondingly shaped drill shank (not shown) to actuate it. When the bore of the chuck becomes worn it has been necessary heretofore to discard the chuck and use a new one. While the life of a chuck has been lengthened by using the best grades of steel and by hardening the chuck after it is machined, yet the best results are not attainable because material having the greatest resistance to wear cannot be machined. To overcome this difficulty I apply inserts 2 of such material, preferably stellite, at opposite ends of the bore 1a.

This is accomplished by carrying the chuck 1 in a housing 3 and positioning it therein by a set screw 3a so that the sides of the bore 1a may be brought one by one to the lowermost horizontal position and be retained in this position. The housing is carried on one end of an open frame comprising two spaced apart members 4 having the space between them in communication with the inner end of the bore 1a. The other end of the frame is provided with a flange 4a to which is secured one end of a cylinder 5. The housing 3 and cylinder 5 have a common axis and in the cylinder is mounted a piston 6 having a piston rod 7 which is guided in a stuffing box 8 and extends forwardly between the frame members 4. A tool holder 9 is secured in any suitable manner to the free end of the rod 7 and the tool holder is guided by rollers 9a in guideways 4b formed as slots in the frame members 4.

A tool 10, having a head 10a of high speed tool steel, is removably carried in the tool holder 9. The operative edge 10b of the head 10a is adapted to engage and shape the exposed inner surface of the insert material as hereinafter described.

The outer end of the chuck 1 projects beyond the housing 3 so that this end may be readily heated and the molten stellite 2 applied thereto. Only one side, preferably the lowermost side, of the bore is treated at one time and this may be heated simultaneously with the melting of the stellite by using an acetylene torch and holding the lower end of a rod of stellite above the lowermost side of the bore so that the molten stellite will be fused to the heated part of the bore. When the side of the bore has been covered to approximately the desired thickness and while the stellite is plastic, the piston 6 is actuated by any suitable means such as air to move the tool 10 through the bore 1a whereby the operative edge 10b will engage and shape the plastic stellite.

If the said edge does not engage the stellite, the tool will serve as a gauge so that the operator will have an idea as to how much insert material has to be added. The edge 10b is spaced a greater distance from the axis of the chuck than the other edges 10c of the head 10a to compensate for the contraction of the bore when the metals cool. The cross-sectional contour of the tool does not need to follow that of the bore so long as the width of the tool is slightly less than the width of the bore when it has been re-faced on all sides and the back of the tool will clear the re-faced sides of the bore.

After the first side of the bore 1a has been faced or re-faced the tool is withdrawn from the bore and the chuck is turned in the housing 3 by loosening the screw 3a to bring a fresh side of the bore into the lowermost position. The insert material is applied to the fresh side as hereinbefore described and is shaped by the operative edge 10b. As the edges 10c are spaced closer to the axis of the chuck than the operative edge 10b, any one of them will clear a re-faced side of the bore after contraction to normal size. The tool 10 is immediately withdrawn from the bore after each operation of the edge 10b. To protect the tool from heat escaping from the bore 1a, I provide a shield 11 which is pivoted at 11a on the frame-members 4 to swing between them. As the tool moves forward it will move the shield out of its path and as the tool is withdrawn the shield will drop in front of the tool to deflect the hot gases from the bore away from the tool head 10a. The shield may be made of heat insulating material or covered by it.

After the insert material has been applied to all the sides of the bore at one end thereof, the chuck 1 is removed from the housing 3 and the finished end is engaged therein so that the opposite end of the bore may be re-faced. The re-facing of the fresh end is accomplished in the same manner as that described for the first end but a slightly smaller tool 10 and head 10a are employed so that the operative edge 10b of the smaller head will pass through the re-faced end of the bore. As the operative edge 10b of each tool is spaced only about .005" further from the axis of the work than the other edges 10c, the internal diameter of the re-faced bore at one end of the chuck will be .010" smaller than the internal diameter of the end finished first. In chucks for this purpose, this slight variation is quite permissible.

To accomodate different sized chucks or different diameters at opposite ends of a chuck, the internal diameter of the housing 3 is considerably larger than the external diameter of a chuck and bushings 12 having different internal diameters are employed to make up these differences. The housing 3 may be provided with a water-jacket having suitable inlet and outlet connections.

The piston 6 is provided with spring bumpers 6a and is reciprocated in the cylinder 5 by fluid directed to either end thereof through the openings 5a, one of the latter will be the inlet and the other the outlet when it is desired to move the piston in one direction and these will be reversed by a three-way valve when it is desired to move the piston in the opposite direction.

It is to be distinctly understood that the word "plastic" used throughout the specification and claims includes the condition of the insert material during the transition period thereof while it is passing from the molten condition to its set condition.

What I claim as my invention is:

1. Apparatus for applying an insert in the bore of a piece of work comprising a housing adapted to receive the work so that molten insert material of extraordinary resistance to wear may be applied to the bore; means for securing the work in the housing; a reciprocable tool holder having a rearwardly extending rod; a guide for the rod; an open frame including two spaced apart members for securing the guide to the housing, the frame members having guide-ways formed therein; rollers carried by the holder and running in the guide-ways; and a tool carried by the holder for passage through the bore.

2. Apparatus for applying an insert in the bore of a piece of work comprising means for carrying the work so that it may be turned to bring different portions of the bore into a lowermost position for applying a portion of molten insert material of extraordinary resistance to wear thereto; a tool having an operative edge; means for guiding the tool to travel through the bore in a direction parallel to the axis of the work and for maintaining the operative edge at a fixed distance from the said axis to engage and shape the exposed inner surface of each application of insert material while said material is plastic, the tool being normally positioned outside the bore; and means for shielding the tool from heat escaping from the bore.

3. Apparatus for applying an insert in the bore of a piece of work comprising a housing adapted to receive the work so that molten insert material of extraordinary resistance to wear may be applied to the bore; means for securing the work in the housing; a reciprocable tool holder having a rearwardly extending rod; a guide for the rod; an open frame including two spaced apart members for securing the guide to the housing, the frame members having guide-ways formed therein; rollers carried by the holder and running in the guide-ways; a tool carried by the holder for passage through the bore; and a shield pivoted on the frame members to swing between them and deflect the heat from the bore of the work when the tool is withdrawn therefrom.

4. A method of applying an insert in a bore of a piece of work which consists in carrying the work so that its bore is substantially horizontal, heating the work adjacent the area to be covered by the insert, applying molten insert material of extraordinary resistance to wear on the lowermost portion of the bore, moving a tool through the bore in a direction parallel to the axis of the work and with its operative edge at a fixed distance from said axis to cause the operative edge to engage and shape the insert material while the said material is plastic, withdrawing the tool from the work immediately after it has operated on the plastic insert material to permit the heat to escape from the bore, turning the work so that a fresh portion of the bore will be lowermost, and repeating the process until all portions of the bore have been treated.

5. Apparatus for applying a polygonal insert in a polygonal bore of a piece of work, comprising means for rotatably supporting the work with its bore substantially horizontal; means for releasably locking the work from turning in the housing to retain any desired side of the bore in a lowermost position; a tool having at one side a straight operative edge of a width slightly less than the width of the bore when re-faced; and means for guiding the tool to travel through the bore in a direction parallel to the axis of the work and for maintaining the said edge at a fixed distance from the said axis so that the said edge is adapted to engage and shape the exposed inner surface of plastic insert material applied to said lowermost side, the said operative edge being spaced a further distance from the axis of the work than any other side of the tool.

6. Apparatus for applying a polygonal insert in a polygonal bore of a piece of work, comprising means for rotatably supporting the work with its bore substantially horizontal; means for releasably locking the work from turning in the housing to retain any desired side of the bore in a lowermost position; a tool having at one side a straight operative edge of a width slightly less than the width of the bore when re-faced; means for guiding the tool to travel through the bore in a direction parallel to the axis of the work and for maintaining the said edge at a fixed distance from the said axis so that the said edge is adapted to engage and shape the exposed inner surface of plastic insert material applied to said lowermost side, the said operative edge being spaced a further distance from the axis of the work than any other side of the tool; and means adapted to automatically position itself for shielding the tool from heat escaping from the bore when the tool has been withdrawn therefrom.

WILLIAM J. McCALLUM.